United States Patent [19]

Shirahata et al.

[11] 4,226,681
[45] Oct. 7, 1980

[54] PROCESS FOR THE PRODUCTION OF A MAGNETIC RECORDING MEDIUM

[75] Inventors: Ryuji Shirahata; Tatsuji Kitamoto, both of Odawara, Japan

[73] Assignee: Fuji Photo Film Co., Ltd., Kanagawa, Japan

[21] Appl. No.: 916,540

[22] Filed: Jun. 19, 1978

[30] Foreign Application Priority Data

Jul. 12, 1977 [JP] Japan ................................. 52/82503

[51] Int. Cl.$^3$ ............................................... C25D 5/00
[52] U.S. Cl. ............................ 204/38 ST; 204/192 R; 427/131; 427/132
[58] Field of Search ................................ 427/127–132, 427/48; 204/38 S, 192 R

[56] References Cited

U.S. PATENT DOCUMENTS 3,525,638  8/1970  Archey ................................. 427/132
3,929,604  12/1975  Shirahata et al. ................. 427/132 X Primary Examiner—Bernard D. Pianalto
Attorney, Agent, or Firm—Armstrong, Nikaido, Marmelstein & Kubovcik

[57] ABSTRACT

This invention relates to a process for the production of a magnetic recording medium, which comprises heating a substrate or subbing layer containing copper as a main component at a temperature of about 100° to 350° C. and, at the same time, vapor depositing in vacuum a ferromagnetic metal containing cobalt as a main component on the substrate or subbing layer to thus form a magnetic recording layer.

8 Claims, No Drawings

PROCESS FOR THE PRODUCTION OF A MAGNETIC RECORDING MEDIUM

BACKGROUND OF THE INVENTION

1. Field of the Invention

This invention relates to a process for the production of a magnetic recording medium having a ferromagnetic metal thin film as a magnetic recording layer and more particularly, it is concerned with a process for producing a magnetic recording medium excellent in magnetic properties by a vacuum vapor deposition method.

2. Description of the Prior Art

Up to the present time, magnetic recording media of binder type have widely been used in which magnetic oxide powders such as $\gamma\text{-}Fe_2O_3$, Co-doped $\gamma\text{-}Fe_2O_3$, $Fe_3O_4$, Co-doped $Fe_3O_4$, Berthollide compounds of $\gamma\text{-}Fe_2O_3$ and $Fe_3O_4$, $CrO_2$, etc. and ferromagnetic alloy powders are dispersed in organic binders such as vinyl chloride—vinyl acetate copolymers, styrene—butadiene copolymers, epoxy resins, polyurethane resins, etc., coated onto non-magnetic supports and dried. Of late, on the other hand, magnetic recording media of the so-called non-binder type have become worthy of notice, in which no binder is used and magnetic recording layers consisting of ferromagnetic metal thin films are formed by the vapor deposition method such as vacuum evaporation, sputtering or ionic-plating, or by the plating method such as electroplating or electroless plating, with the increase of requirements for high density recording, and various efforts have been made for the purpose of realizing the magnetic recording media of this type.

Since in the prior art magnetic recording media of binder type, metal oxides having a smaller saturation magnetization than ferromagnetic metals are mainly used as a magnetic material, the thickness reduction required for high density recording has reached a limit because of resulting in lowering of the signal output and complicated processings and large special installations to recover the solvent and to prevent the public hazards are required for the production of such magnetic recording media. On the contrary, the magnetic recording media of non-binder type have the advantages that the process for the production thereof is simple and an extreme thickness reduction is possible because a ferromagnetic metal having a larger saturation magnetization than metal oxides is formed as a thin film under such a state as being free from non-magnetic materials such as organic binders.

In particular, the vacuum vapor deposition method has hitherto been considered important as a method for producing a magnetic recording medium of non-binder type because of obtaining a large deposition speed of film with a simple production step and without a step of treating a waste liquor as in the case of plating. The following methods are known as a method of obtaining a ferromagnetic thin film having a high coercive force and high squareness ratio required for a magnetic recording medium by vacuum vapor deposition:

1. A method comprising controlling the degree of vacuum or vapor deposition speed (A. V. Davies et al, "IEEE Trans. Magnetics", Vol. MAG-1, No. 4 (1965), page 344; U.S. Pat. No. 3,787,237), 2. A method comprising selecting the compositions of vapor deposited metals (Z. Piskacek et al, "Thin Solid Films", Vol. 2 (1968), page 487; Japanese Patent Publication No. 23025/1968, Japanese Patent Application (OPI) No. 105508/1974; U.S. Pat. Nos. 3,516,860 and 3,775,179), 3. A method comprising making an evaporated beam of ferromagnetic material incoming slantly to a substrate (W. J. Schule, "J. Appl. Physics", Vol. 35 (1964), page 2558; Japanese Patent Publication Nos. 29944/1964, 19389/1966 and 13912/1967; Japanese Patent Application (OPI) No. 74911/1974, and U.S. Pat. Nos. 3,342,632 and 3,342,633), and 4. A method comprising forming a vapor deposited oxide film in an oxidizing atmosphere (J. W. Schneider et al, "IEEE Trans. Magnetics", Vol. MAG-9, No. 3 (1973), page 183; Japanese Patent Application (OPI) Nos. 37695/1973 and 73103/1974; U.S. Pat. No. 3,700,500).

These methods, however, are unsatisfactory because of the disadvantages that desired magnetic properties cannot sufficiently be obtained, the vapor deposition step is complicated, the adhesion between the magnetic thin film and substrate is not good and the vapor deposition efficiency is low.

SUMMARY OF THE INVENTION

It is an object of the present invention to provide a magnetic recording medium having a ferromagnetic metal thin film as a magnetic recording layer.

It is another object of the present invention to provide a process for the production of a novel magnetic recording medium by vacuum vapor deposition, whereby the above described disadvantages can be overcome.

It is a further object of the present invention to provide a process for producing a magnetic recording medium by vapor depositing in vacuum a ferromagnetic metal on a substrate of non-magnetic metal containing copper.

These objects can be attained by a process for the production of a magnetic recording medium which comprises heating a substrate of non-magnetic metal consisting mainly of copper at a temperature of about 100° to 350° C. and, at the same time, vapor depositing in vacuum a ferromagnetic metal consisting mainly of cobalt on the substrate, or a process for the production of a magnetic recording medium which comprises providing a subbing layer consisting mainly of copper on a non-magnetic substrate, then heating the substrate at a temperature of about 100° to 350° C. and, at the same time, vapor depositing in vacuum a ferromagnetic metal consisting mainly of cobalt on the subbing layer to form a magnetic recording layer.

DETAILED DESCRIPTION OF THE INVENTION

In accordance with the present invention, there is provided a process for the production of a magnetic recording medium, which comprises heating a substrate or subbing layer containing copper at a temperature of about 100° C. to 350° C. and, at the same time, vacuum vapor depositing a ferromagnetic metal containing cobalt on the substrate or subbing layer to thus form a magnetic recording layer.

Methods of forming a magnetic layer on an subbing layer of copper by electroplating or electroless plating are disclosed in Japanese Patent Publication Nos. 16467/1964, 9461/1965, 16063/1965, 18038/1972 and 38001/1975, Japanese Patent Application (OPI) Nos.

18842/1973, 56109/1973, 41241/1974 and 96203/1975 and Japanese Utility Model Publication No. 26246/1972, which aim at improving the adhesiveness between the subbing layer and magnetic layer, decreasing pinholes in the electrically conductive substrate to be electroplated and raising the magnetic properties.

On the contrary, the inventors have found that in the case of vacuum vapor deposition different from plating in film-forming mechanism, a magnetic recording medium excellent in magnetic properties as well as adhesiveness can be produced by depositing a magnetic layer consisting mainly of cobalt on a substrate consisting mainly of copper while heating the substrate at a temperature of 100° to 350° C. The present invention is based on this finding.

The non-magnetic substrate or subbing layer consisting mainly of copper used in the present invention contains generally 95% or more of copper, preferably 98% or more of copper. This substrate or subbing layer of copper is preferably of electrolytic copper. The subbing layer consisting mainly of copper can be provided by vacuum vapor deposition, ionic-plating, sputtering, electroplating, electroless plating or laminating. Preferably, the copper subbing layer can be provided by electroplating or electroless plating. The thickness of the subbing layer is preferably about at least 500 Å, more preferably 800 Å to 1 μm for the purpose of accomplishing the object of the present invention.

The vacuum vapor deposition in the present invention can be carried out in conventional manner using an ordinary vacuum vapor deposition apparatus. The vacuum vapor deposition method is described in detail, for example, in L. H. Holland, "Vacuum Deposition of This Films" (Chapman & Hall Ltd., 1956) and L. I. Maissel & R. Glang, "Handbook of Thin Film Technology" (McGraw-Hill Co., 1970).

When the vacuum deposition is carried out according to the present invention, it is preferable to adjust the degree of vacuum to $10^{-4}$ Torr or less and the speed of vapor deposition to 0.03 to 3 μm/min. Furthermore, the temperature of a substrate during the vacuum vapor deposition is preferably kept at about 100° to 350° C. When a substrate is kept within this temperature range and a ferromagnetic metal consisting mainly of cobalt is subjected to vapor deposition in vacuum thereon, a magnetic thin film excellent in magnetic properties as well as adhesiveness can be formed to give an excellent magnetic recording medium.

The ferromagnetic metal consisting mainly of cobalt used in the present invention means a ferromagnetic metal containing 70% by weight or more of cobalt, for example, Co, Co-Fe, Co-Ni, Co-Si, Co-V, Co-Y, Co-La, Co-Ce, Co-Pr, Co-Sm, Co-Gd, Co-Mn, Co-Cu, Co-P, Co-Cr, Co-Ni-Fe, Co-Ni-P, Co-Ni-V, Co-Ni-Si, Co-Fe-V, Co-Fe-Si, Co-Ni-Cu, Co-Fe-Cu, Co-Sm-Cu, etc. The thickness of the ferromagnetic metal layer is generally about 0.02 to 5 μm, preferably 0.05 to 2 μm.

As a non-magnetic substrate to be provided with the subbing layer consisting mainly of copper, there are heat-resisting plastic bases such as polyimides, metals such as aluminum, brass, stainless steels, etc., glass and ceramics. The shape of such a substrate can be chosen from any of tapes, sheets, cards, disks and drums.

When a non-magnetic substrate consisting mainly of copper or a non-magnetic substrate having a subbing layer consisting mainly of copper is heated at about 100° to 350° C. and simultaneously, a ferromagnetic metal consisting mainly of cobalt is vapor deposited in vacuum on the substrate or subbing layer according to the present invention, a magnetic recording medium with excellent magnetic properties and good adhesiveness can be produced.

The present invention will be explained in detail with reference to the following examples. It will be obvious to one skilled in the art that various changes and modifications can be made in the components, ratios, operationsl order and the like without departing from the spirit of the present invention. Therefore, the present invention should not be construed as being limited to the following examples.

EXAMPLE 1

A substrate of electrolytic copper (Cu 99%) having a thickness of 45 μm was arranged in a commercially sold vacuum vapor deposition apparatus and heated, while cobalt was vapor deposited thereon at a rate of 30 Å/sec in a degree of vacuum of $1.0 \times 10^{-5}$ Torr to give a film thickness of 0.3 μm, thus obtaining a magnetic recording medium. The magnetic properties of magnetic films vapor deposited with varying the temperature of the substrate are shown in the following table:

Table 1

| Temperature of Substrate (°C.) | Magnetic Properties | |
|---|---|---|
| | Coercive Force (Oe) | Squareness Ratio |
| Room Temperature (25° C.) | 65 | 0.56 |
| 100 | 280 | 0.72 |
| 150 | 450 | 0.75 |
| 200 | 580 | 0.75 |
| 250 | 620 | 0.77 |
| 300 | 550 | 0.75 |
| 350 | 395 | 0.72 |
| 400 | 110 | 0.52 |

As shown in the following table, the adhesiveness of the magnetic film to the substrate is very excellent when the temperature of the substrate was 100° C. or higher. This is sufficiently resistant to practical use as a magnetic recording medium.

Table 2

| Temperature of Substrate (°C.) | Adhesiveness |
|---|---|
| Room Temperature (25° C.) | Not Good |
| 100 | Very Good |
| 150 | Very Good |
| 200 | Very Good |
| 250 | Very Good |
| 300 | Very Good |
| 350 | Very Good |
| 400 | Very Good |

As apparent from these results, when a copper substrate is subjected to vapor deposition while keeping the temperature at 100° to 350° C., a magnetic film having excellent magnetic properties as a magnetic recording medium as well as an excellent adhesiveness is obtained.

EXAMPLE 2

A polyimide base with a thickness of 25 microns was subjected to surface activation for electroless plating by sputtering palladium in a proportion of 0.005 mg/cm² and then immersed in an electroless plating solution having the following composition to obtain a plating of copper film (Cu 98%) with a thickness of 0.2 μm.

Plating Composition

| | |
|---|---|
| Solution A | |
| $CuSO_4 \cdot 5H_2O$ | 7.5 g |
| HCHO | 5 ml |
| Water | 200 ml |
| Solution B | |
| $KNaC_4H_4O_6 \cdot 4H_2O$ | 17.5 g |
| $Na_2CO_3 \cdot 10H_2O$ | 7.5 g |
| Water | 400 ml |

Solution A and Solution B were mixed to which a solution of caustic soda was added to adjust the pH to 12. The thus obtained substrate for vapor deposition is designated as "2-b".

On the other hand, a polyimide base with a thickness of 25 μm was subjected to ionic plating in an argon gas with 0.01 Torr at an applied voltage of 3 KV to form a copper film (Cu 99%) with a thickness of 0.2 μm. The thus obtained substrate for vapor deposition, having the subbing layer of copper, is designated as "2-c".

Then, each of the polyimide base designated as "2-a" and the above described substrates 2-b and 2-c was arranged in a vacuum vapor deposition apparatus and heated, while Co-Ni (Co 78% by weight) was vapor deposited thereon in vacuum with a degree of vacuum of $2 \times 10^{-5}$ Torr at a rate of 50 Å/sec to form a magnetic film having a thickness of 0.1 μm. The relationship between the magnetic properties of the resulting magnetic film and the temperature of the substrate is as shown in the following table:

Table 3

| Temperature of Substrate (°C.) | Substrate 2-a | | Substrate 2-b | | Substrate 2-c | |
|---|---|---|---|---|---|---|
| | Coercive Force(Oe) | Squareness Ratio | Coercive Force(Oe) | Squareness Ratio | Coercive Force(Oe) | Squareness Ratio |
| 25 | 85 | 0.65 | 90 | 0.53 | 35 | 0.68 |
| 100 | 80 | 0.58 | 255 | 0.75 | 420 | 0.73 |
| 175 | 85 | 0.60 | 530 | 0.75 | 405 | 0.77 |
| 250 | 105 | 0.55 | 585 | 0.74 | 400 | 0.72 |
| 325 | 75 | 0.63 | 635 | 0.70 | 355 | 0.70 |
| 400 | 95 | 0.65 | 125 | 0.63 | 95 | 0.50 |

When a substrate was provided with a subbing layer of copper and heated at 100° to 325° C. as in this example, there was obtained a magnetic film having a large coercive force and large squareness ratio as well as a good adhesiveness.

EXAMPLE 3

Using the following electroplating solution, a brass sheet (Cu 70%, Zn 30%) was coated with a subbing layer of copper (Cu 98%) to give a thickness of 0.5 μm.

| | |
|---|---|
| Copper Sulfate ($CuSO_4 \cdot 5H_2O$) | 220 g |
| Sulfuric Acid ($H_2SO_4$) | 35 ml |
| Thiourea (($NH_2$)CS) | 0.01 g |
| Sodium Chloride (NaCl) | 60 mg |
| Water to 1000 ml | |
| Current Density | 1.5 Å/dm² |

Then, Co-V (Co 85% by weight) was vapor deposited on the thus obtained substrate (designated as "3-b") for vapor deposition of a magnetic film and the subbing layer-free brass sheet (designated as "3-a") in a vacuum with a degree of vacuum of $8 \times 10^{-6}$ Torr at a vapor deposition rate of 60 Å/sec to give a film thickness of 0.2 μm. The relationship between the magnetic properties of the resulting magnetic film and the temperature of the substrate is as shown in the following table.

Table 4

| Temperature of Substrate (°C.) | Substrate 3-a | | Substrate 3-b | |
|---|---|---|---|---|
| | Coercive Force(Oe) | Squareness Ratio | Coercive Force(Oe) | Squareness Ratio |
| 25 | 110 | 0.33 | 125 | 0.50 |
| 100 | 105 | 0.42 | 505 | 0.70 |
| 175 | 120 | 0.38 | 620 | 0.78 |
| 250 | 160 | 0.35 | 635 | 0.77 |
| 325 | 175 | 0.42 | 615 | 0.69 |
| 400 | 130 | 0.38 | 330 | 0.45 |

It is apparent from these results that more excellent magnetic properties are obtained in the case of providing a subbing layer of copper and heating at 100° to 325° C. than in the case of using the brass substrate as it is.

EXAMPLE 4

An aluminum alloy sheet (Al 97%, Cu 3%) was immersed for 15 seconds in the following solution to effect the zinc substitution plating and then subjected to electroless copper plating using the plating solution of Example 2, thus forming a copper plating layer (Cu 98%) with a thickness of 0.1 μm. The thus resulting substrate is designated as "4-b".

| | |
|---|---|
| Caustic Sada (NaOH) | 120 g |
| Zinc Oxide (ZnO) | 20 g |
| Potassium Sodium Tartrate ($KNaC_4H_4O_6 \cdot 4H_2O$) | 50 g |
| Ferric Chloride ($FeCl_3$) | 2 g |
| Sodium Nitrate ($NaNO_3$) | 1 g |
| Water to 1000 ml | |

Then, Co-Fe (Co 90% by weight) was vapor deposited on the above described substrate 4-b and the copper subbing layer-free aluminum alloy sheet designated as "4-a" in a vacuum with a degree of vacuum of $1 \times 10^{-5}$ Torr at a vapor deposition rate of 100 Å/sec to give a film thickness of 0.4 μm. The relationship between the magnetic properties of the resulting magnetic film and the temperature of the substrate is as shown in the following table.

Table 5

| Temperature of Substrate (°C.) | Substrate 4-a | | Substrate 4-b | |
|---|---|---|---|---|
| | Coercive Force (Oe) | Squareness Ratio | Coercive Force (Oe) | Squareness Ratio |
| 25 | 100 | 0.62 | 115 | 0.58 |
| 100 | 90 | 0.65 | 410 | 0.68 |
| 150 | 95 | 0.63 | 500 | 0.70 |
| 200 | 115 | 0.70 | 515 | 0.70 |
| 250 | 90 | 0.60 | 505 | 0.72 |
| 300 | 85 | 0.62 | 495 | 0.72 |
| 350 | 70 | 0.63 | 430 | 0.68 |
| 400 | 75 | 0.58 | 215 | 0.50 |

When a substrate was coated with a subbing layer of copper and heated at 100° to 350° C. as in this example, there was obtained a magnetic film having excellent magnetic properties as well as a good adhesiveness.

EXAMPLE 5

A glass substrate was subjected to desorption, washing and drying and then to vacuum vapor deposition to form a copper film (Cu 99%) with a thickness of 0.15 μm, thus obtaining Substrate 5-b. This substrate was further subjected to copper plating using the electroplating solution used in Example 3 to form a copper film (Cu 98%) with a thickness of 0.15 μm, thus obtaining Substrate 5-c. Then, Co-Cr (Co 88% by weight) was vapor deposited on the thus obtained substrates 5-b and 5-c and the subbing layer-free glass substrate designated as "5-a" in a vacuum with a degree of vacuum of $2\times 10^{-5}$ Torr at a vapor deposition rate of 80 Å/sec to give a film thickness of 0.3 μm. The relation between the magnetic properties of the resulting magnetic film and the temperature of the substrate during the vapor deposition is shown in the following table.

Table 6

| Temperature of Substrate (°C.) | Substrate 5-a | | Substrate 5-b | | Substrate 5-c | |
|---|---|---|---|---|---|---|
| | Coercive Force (Oe) | Squareness Ratio | Coercive Force (Oe) | Squareness Ratio | Coercive Force (Oe) | Squareness Ratio |
| 25 | 180 | 0.45 | 120 | 0.50 | 135 | 0.44 |
| 100 | 175 | 0.60 | 315 | 0.68 | 285 | 0.70 |
| 175 | 175 | 0.62 | 375 | 0.72 | 485 | 0.71 |
| 250 | 195 | 0.58 | 425 | 0.75 | 590 | 0.70 |
| 325 | 95 | 0.55 | 405 | 0.68 | 515 | 0.70 |
| 400 | 105 | 0.48 | 250 | 0.44 | 215 | 0.50 |

As apparent from these results, when the substrate was coated with a subbing layer of copper and subjected to vapor deposition while heating of 100° to 325° C., there was obtained a magnetic film having excellent magnetic properties.

It will clearly be understood from these examples that a magnetic recording medium having excellent magnetic properties as well as excellent adhesiveness can be obtained according to the process for the production of a magnetic recording medium of the present invention.

What is claimed is:

1. A process for the production of a magnetic recording medium, which comprises heating a substrate or subbing layer having a thickness of at least 500 Å containing at least 95% copper at a temperature of about 100° to 350° C. and, at the same time, vapor depositing at a vapor deposition speed of 0.03 to 3 μm/min. in a vacuum of at most $10^{-4}$ Torr a ferromagnetic metal containing at least 70% by weight cobalt directly on the substrate or subbing layer to thus form a magnetic recording layer.

2. The process as claimed in claim 1, wherein the ferromagnetic metal is vapor deposited in a thickness of about 0.02 to 5 μm.

3. The process as claimed in claim 1, wherein the substrate consists of electrolytic copper.

4. The process as claimed in claim 1, wherein the subbing layer is provided on a non-magnetic substrate.

5. The process as claimed in claim 4, wherein the subbing layer is provided by vacuum vapor deposition, ionic plating, sputtering, electroplating or electroless plating.

6. The process as claimed in claim 4, wherein the subbing layer is laminated.

7. The process as claimed in claim 4, wherein the non-magnetic substrate consists of a material selected from the group consisting of heat resisting plastics, aluminum, brass, stainless steels, glass and ceramics.

8. The process as claimed in claim 7, wherein the ferromagnetic metal is selected from the group consisting of Co, Co-Fe, Co-Ni, Co-Si, Co-V, Co-Y, Co-La, Co-Ce, Co-Pr, Co-Sm, Co-Gd, Co-Mn, Co-Cu, Co-P, Co-Cr, Co-Ni-Fe, Co-Ni-P, Co-Ni-V, Co-Ni-Si, Co-Fe-V, Co-Fe-Si, Co-Ni-Cu, Co-Fe-Cu and Co-Sm-Cu.

* * * * *